United States Patent

Takikawa et al.

[11] Patent Number: 5,125,491
[45] Date of Patent: Jun. 30, 1992

[54] TEMPERATURE SENSITIVE TYPE FLUID FAN COUPLING APPARATUS

[75] Inventors: Kazunori Takikawa; Yuichi Ono, both of Numazu; Hiroshi Inoue, Fuji, all of Japan

[73] Assignee: Usui Kokusai Sangyo Kaisha Limited, Japan

[21] Appl. No.: 716,913

[22] Filed: Jun. 18, 1991

[30] Foreign Application Priority Data

Jun. 21, 1990 [JP] Japan ............ 2-163175
Jun. 21, 1990 [JP] Japan ............ 2-163176

[51] Int. Cl.⁵ ............................................. F16D 31/00
[52] U.S. Cl. ................................. 192/58 B; 192/82 T
[58] Field of Search ...................... 192/58 B, 82 T

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 4,974,713 | 12/1990 | Maus et al. | 192/58 B |
| 5,018,612 | 5/1991 | Takikawa et al. | 192/58 B |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 62-124330 | 6/1987 | Japan . |

Primary Examiner—Leslie A. Braun
Assistant Examiner—Andrea Pitts
Attorney, Agent, or Firm—Anthony J. Casella; Gerald E. Hespos

[57] ABSTRACT

Herein disclosed is a temperature sensitive type fluid fan coupling apparatus which comprises: a sealed container including a casing and a cover, the container being borne through a bearing on a rotating shaft, which has a drive disc fixed to its leading end, and having a cooling fan attached to its outer circumference; a partition dividing the inside of the sealed container into an oil sump and a torque transmission chamber housing the drive disc, a dam formed in a portion of such an inner circumference of the sealed container as faces the outer circumference of the drive disc, on which the oil is collected at the time of rotation; a circulation passage communicating with the dam and leading from the torque transmission chamber to the oil sump; a valve member fitted in the oil sump for opening an outflow adjusting orifice leading to the torque transmission chamber, if the ambient temperature exceeds a preset value, and closing the same if below the preset value; and a temperature sensing element mounted on the front face of the cover and associated with the valve member if deformed in accordance with the temperature change. Thus, the effective contact area of the oil at a torque transmission gap, which is formed between the opposed wall faces of the drive disc and the sealed container in the vicinity of the outside, is increased or decreased to control the torque transmission from the rotating shaft at the drive side to the sealed container at the driven side. The opening of the output adjusting orifice to be opened or closed by the valve member is formed to intersect the partition generally at a right angle.

12 Claims, 5 Drawing Sheets

TEMPERATURE SENSITIVE TYPE FLUID FAN COUPLING APPARATUS

BACKGROUND OF THE INVENTION

1. Field of the Invention

The present invention relates to an improvement in the structure of a temperature sensitive type fluid fan coupling apparatus for feeding a cooling wind to the engine of an automobile, while controlling the flow rate of the cooling wind of an engine cooling fan automatically by sensing a change in the ambient temperature without interruption in accordance with the running state.

2. Description of the Prior Art

The conventional fan coupling apparatus of this kind is generally constructed, as shown of its essential portion in FIGS. 13 and 14, such that a partition 25 is formed with an outflow adjusting orifice 25' leading from an oil sump 26 to a torque transmission chamber 24 and such that a valve member 28 having its one end fixedly riveted to the partition 25 has its other displaced to and from the outflow adjusting orifice 25' to open or close the outflow adjusting orifice 25' by a connecting rod 29 which is associated with a deformation of a temperature sensing element mounted on the front face of a sealed container in accordance with a change in the ambient temperature.

In this prior art, however, the oil flow rate through the outflow adjusting orifice 25' is controlled by the gap between the valve member 28 and the outflow adjusting orifice 25' of the partition 25. As a result, even if the valve member is precisely associated with the temperature change of the temperature sensing element, this association will not lead to a precise control of the oil flow rate. Specifically, the oil will freely pass through the outflow adjusting orifice 25' till the gap is narrowed to a preset value in the closing stroke of the outflow adjusting orifice 25'. If this gap is reached, the valve member 28 is sucked to the outflow adjusting orifice 25' to narrow the flow passage abruptly by the back pressure of the oil which is pressurized by the centrifugal force from the oil sump 26 to the torque transmission chamber 24. In the opening stroke, on the contrary, the effective passage area is abruptly augmented to increase the inflow of the oil into the torque transmission chamber 24 if the preset gap is reached.

This phenomenon is called the "hunting", which is absolutely contrary to the intrinsic object of the temperature sensitive type fluid fan coupling apparatus for controlling the rotational speed of the fun proportionally of the change in the ambient temperature.

In the prior art having the partition 25 formed with the outflow adjusting orifice 25', moreover, the stroke for opening or closing the outflow adjusting orifice 25' by the valve member 28 is determined by the ratio (i.e., lever ratio) between the distance $l_1$ between the fixedly riveted portion and the axis of the connecting rod 29 and the distance $l_2$ between the riveted portion and the outflow adjusting orifice 25'. Since the distance $l_2$ cannot take a large value, the aforementioned stroke cannot take a large value so that the outflow adjusting orifice 25' can hardly be controlled finely and precisely according to the change in the ambient temperature.

Since, still moreover, the outflow adjusting orifice 25' is so formed inside of the outermost circumference of the oil sump 26 as to avoid the interference between the inner circumference of the oil sump 26 and the aforementioned valve member 28, the oil is fed with many air bubbles from the outflow adjusting orifice 25' to the torque transmission chamber 24. As a result, the torque is transmitted in the aerated state in the gap so that its transmission will fluctuate to make the rotational speed of the fun unstable.

SUMMARY OF THE INVENTION

The present invention has been conceived in view of the aforementioned problems of the prior art and has a major object to provide a temperature sensing type fluid fan coupling apparatus which prevents the aforementioned suction phenomenon so that it is enabled to reduce the rotational speed of the fan in proportion by controlling the effective area of the outflow adjusting orifice precisely in accordance with a change in the ambient temperature.

Another object of the present invention is to provided a temperature sensing type fluid fan coupling apparatus which is enabled to increase or decrease the rotational speed of the fan in proportion by controlling the effective area of the outflow adjusting orifice in accordance with the change in the ambient temperature while preventing the "hunting" phenomenon based upon the aforementioned suction phenomenon and to achieve stable fan rotations, while preventing the fluctuations of the torque transmission, by feeding the oil having little aeration through the outflow adjusting orifice to the torque transmission chamber finely and precisely in response to the change in the ambient temperature.

In order to achieve the above-specified objects, according to a first mode of embodiment of the present invention, there is provided a temperature sensitive fluid type fan coupling apparatus which comprises: a sealed container including a casing and a cover, said container being borne through a bearing on a rotating shaft, which has a drive disc fixed to its leading end, and having a cooling fan attached to its outer circumference; a partition having an oil outflow adjusting orifice and dividing the inside of said sealed container into an oil sump and a torque transmission chamber housing said drive disc; a dam formed in a portion of such a side wall of the inner circumference of said sealed container as faces the side wall of the outer circumference of said drive disc, on which the oil is collected at the time of rotation; a circulation passage communicating with said dam and leading from said torque transmission chamber to said oil sump; a valve member positioned in said oil sump and having its one end fixed to the inner wall of said oil sump and its other end for opening the outflow adjusting orifice of said partition, if the ambient temperature exceeds a present value, and closing the same if below said present value; and a temperature sensing element mounted on the front face of said cover and associated with said valve member if deformed in accordance with the temperature change, whereby the effective contact area of the oil at a torque transmission gap, which is formed between the opposed wall faces of said drive disc and said sealed container in the vicinity of the outside, is increased or decreased to control the torque transmission from said rotating shaft at the drive side to said sealed container at the driven side, wherein the improvement resides in that the opening of said output adjusting orifice to be opened or closed by said valve member is formed to intersect said partition generally at a right angle.

According to a second mode of embodiment of the present invention, there is provided a temperature sensitive fluid type fan coupling apparatus which comprises: a sealed container including a casing and a cover, said container being borne through a bearing on a rotating shaft, which has a drive disc fixed to its leading end, and having a cooling fan attached to its outer circumference; a partition having an oil outflow adjusting orifice and dividing the inside of said sealed container into an oil sump and a torque transmission chamber housing said drive disc; a dam formed in a portion of such a side wall of the inner circumference of said sealed container as faces the side wall of the outer circumference of said drive disc, on which the oil is collected at the time of rotation; a circulation passage communicating with said dam and leading from said torque transmission chamber to said oil sump; a valve member positioned in said oil sump and having its one end fixed to the inner wall of said oil sump and its other end for opening the outflow adjusting orifice of said partition, if the ambient temperature exceeds a present value, and closing the same if below said present value; and a temperature sensing element mounted on the front face of said cover and associated with said valve member if deformed in accordance with the temperature change, whereby the effective contact area of the oil at a torque transmission gap, which is formed between the opposed wall faces of said drive disc and said sealed container in the vicinity of the outside, is increased or decreased to control the torque transmission from said rotating shaft at the drive side to said sealed container at the driven side, wherein the improvement resides: in that a cap-shaped wall is formed in the front or back face of said partition in the vicinity of the outside; in that said output adjusting orifice leading to said torque transmission chamber is formed in a portion of the side of said cap-shaped wall; and in that a sealing portion is formed at the leading end of said valve member for opening or closing said outflow adjusting orifice. Moreover, said cap-shaped wall is molded separately of said partition and fixed to said partition. A weight is disposed in the vicinity of the leading end of said valve member. Said sealing portion is made of a bent wall or a sealing member.

According to a third mode of embodiment of the present invention, there is provided a temperature sensitive fluid type fan coupling apparatus which comprises: a sealed container including a casing and a cover, said container being borne through a bearing on a rotating shaft, which has a drive disc fixed to its leading end, and having a cooling fan attached to its outer circumference; a partition dividing the inside of said sealed container into an oil sump and a torque transmission chamber housing said drive disc; a dam formed in a portion of such a side wall of the inner circumference of said sealed container as faces the side wall of the outer circumference of said drive disc, on which the oil is collected at the time of rotation; a circulation passage communicating with said dam and leading from said torque transmission chamber to said oil sump; a valve member positioned in said oil sump and having its one end fixed to the inner wall of said oil sump and its other end for opening an outflow adjusting orifice leading from said oil sump to said torque transmission chamber, if the ambient temperature exceeds a present value, and closing the same if below said present value; and a temperature sensing element mounted on the front face of said cover and associated with said valve member if deformed in accordance with the temperature change, whereby the effective contact area of the oil at a torque transmission gap, which is formed between the opposed wall faces of said drive disc and said sealed container in the vicinity of the outside, is increased or decreased to control the torque transmission from said rotating shaft at the drive side to said sealed container at the driven side, wherein the improvement resides: in that said outflow adjusting orifice leading to said torque transmission chamber is formed in a portion of the inner circumference of said cover forming said oil sump; and in that a sealing portion is formed at the leading end of said valve member for opening or closing said outflow adjusting orifice. Moreover, said sealing portion is made of a bent wall or a sealing member. The vicinity of the opening of said outflow adjusting orifice and the sliding face of said sealing portion are formed generally in an arcuate shape. Said outflow adjusting orifice is formed in a circumferential or axial slot in said oil sump.

According to the present invention thus constructed, the outflow adjusting orifice to be opened or closed by the aforementioned valve member is formed to intersect the partition generally at a right angle and in either the side face of the cap-shaped wall formed in the aforementioned partition or in the inner circumference of the cover, and the sealing portion of the valve member is formed in the outer circumference for opening or closing said outflow adjusting orifice. Thanks to these structure, the suction phenomenon is prevented, and the opening area of the outflow adjusting orifice itself is controlled directly by the sealing portion of the valve member by the sliding displacement of the sealing portion with the outflow adjusting orifice in the opening and closing strokes of the valve member. As a result, the flow rate controlling function in the outflow adjusting orifice can be exhibited accurately and precisely without the so-called "hunting" phenomenon in accordance with a change in the ambient temperature, to improve the characteristics of the product.

By forming the outflow adjusting orifice in the outermost circumference in the oil sump, moreover, the oil prevailing in the outflow adjusting orifice is hardly aerated by the centrifugal force to be applied and is fed to the torque transmission chamber to cause no fluctuation in the transmission torque in the torque transmission gap. Thanks to a large lever ratio obtainable, furthermore, the valve member can be highly moved even by the slight movement of the connecting rod due to the change in the ambient temperature so that the outflow adjusting orifice can be opened or closed finely and precisely.

BRIEF DESCRIPTION OF THE PREFERRED EMBODIMENTS

Figure 1:
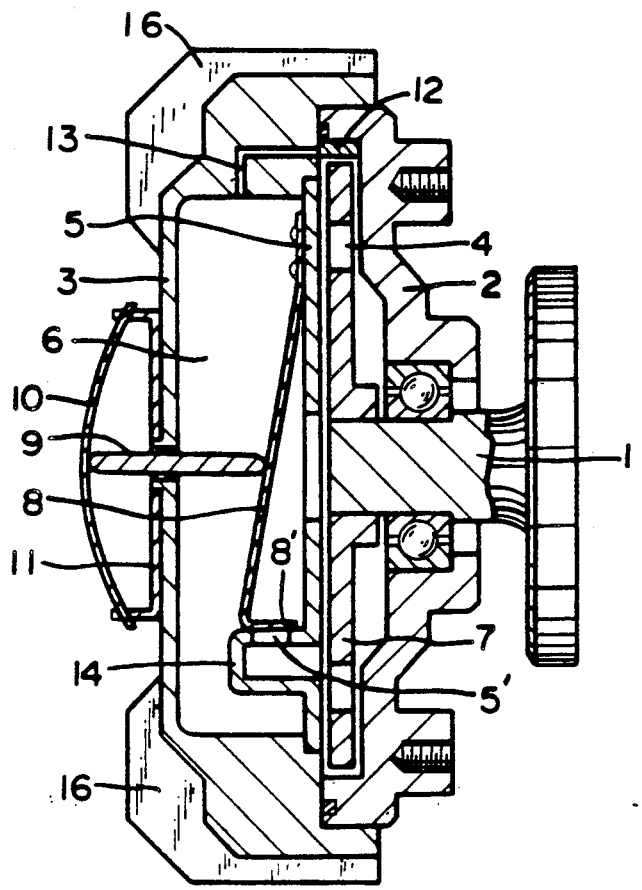
FIG. 1 is a partially cut-away longitudinal section showing a temperature sensitive type liquid fan coupling apparatus according to one embodiment of the present invention.
Figure 2:
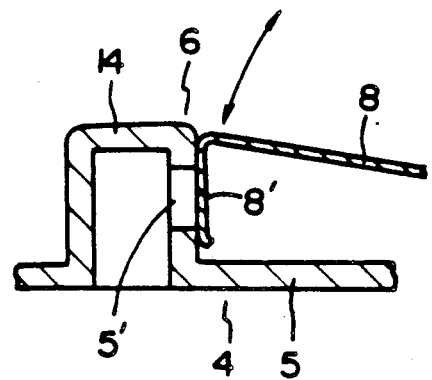
FIG. 2 is an enlarged cut-away section showing an essential portion of the embodiment FIG. 1 in the vicinity of the outflow adjusting orifice according to the present invention.

Throughout FIGS. 1 to 11, identical parts are designated at identical reference numerals.

Figure 5:
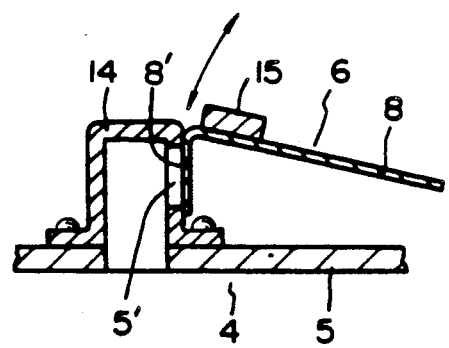
Figure 6:
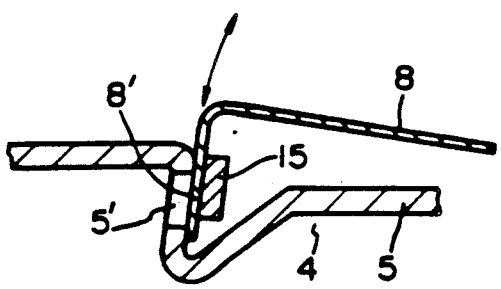

In the first embodiment shown in FIGS. 1 to 7, reference numeral 1 designates a rotating shaft acting as a drive side. This rotating shaft 1 has a drive disc 7 fixed to its leading end and bears thereon through a bearing a sealed container which has a cooling fan (although not shown) on its outer circumference and which is composed of a casing 2 and a cover 3. Numeral 5 designates a disc-shaped partition which is formed with a cap-shaped wall 14 on its front (as shown in FIGS. 2, 3, 4 and 5) or back (as shown in FIG. 6) face in the vicinity of its outside. The partition 5 divides the inside of the sealed container into an oil sump 6 and a torque transmission chamber 4 fitting the aforementioned drive disc 7 therein. The cap-shaped wall 14 has its side wall formed with an oil outflow adjusting orifice 5' is opened to intersect the partition 5 generally at a right angle. Incidentally, the cap-shaped wall 14 may be either formed integrally with the partition 5 or formed separately and fixed on the partition 5, as shown in FIG. 5.

Figure 3A:
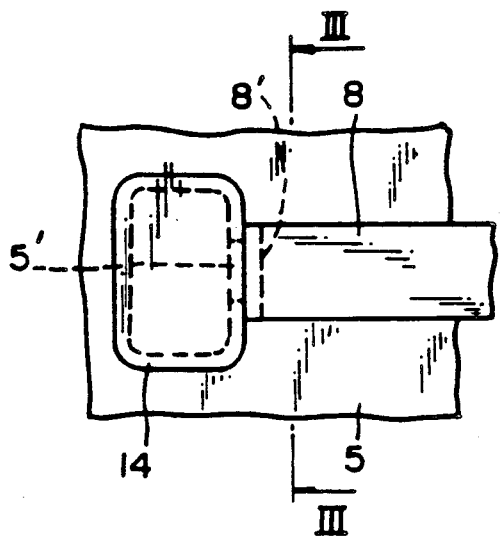
FIG. 3A is top plan view of FIG. 2.
Figure 3B:
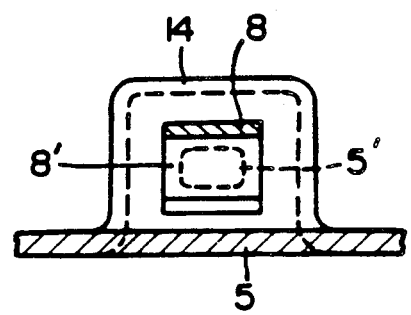
FIG. 3B is section taken along line III—III of FIG. 3A.
Figure 4:
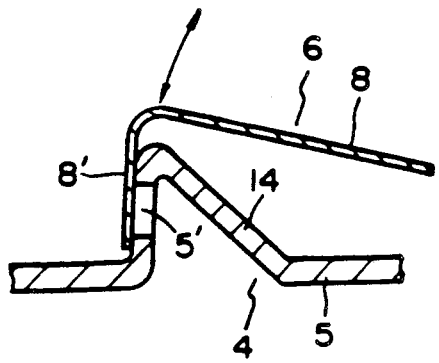
FIGS. 4, 5, and 6 and FIGS. 7A and 7B are similar to FIG. 2 but show other embodiments, respectively.

In order to acquire the desired performance characteristics, a suitable shape such as a circular, rectangular, triangular or square shape can be selected as the shape of the outflow adjusting orifice 5' which is formed in the side wall of the cap-shaped wall 14. In case, however, a square outflow adjusting orifice (as shown in FIG. 3B) is formed, the effective area obtained is accurately proportional to the stroke, as indicated at $\alpha$ in FIG. 12.

The aforementioned drive disc 7 is held in the torque transmission chamber 4 and at a small gap from its opposed wall to transmit the torque. Numeral 8 designates a valve member for opening or closing the outflow adjusting orifice 5'. This valve member 8 is positioned at the side of the oil sump 6 and has its one end fixedly riveted to the partition 5 and its other end for opening or closing the aforementioned outflow adjusting orifice 5' by a bent wall 8' constituting a sealing portion. On the front face of the aforementioned cover 3, moreover, there is fixed a support member 11 which retains the two ends of a temperature sensing element 10 made of a bimetal leaf. The valve member 8 is so disposed inside that it is associated through a connecting rod 9 with the deformation of the temperature sensing element 10 in accordance with a change in the ambient temperature. Numeral 12 designates a dam which is formed in a portion of such an inner circumference of the sealed container as faces the outer circumference of the aforementioned drive disc 7, in which the oil is collected by the centrifugal force at the rotating time. This dam 12 performs a pumping function together with a circulation passage 13 which has communication with an inlet rotationally upstream of said dam and which leads from the torque transmission chamber 4 to the oil sump 6. Numeral 15 designates a weight which is disposed in the vicinity of the leading end of the valve member 8, as shown in FIGS. 5 and 6. In the action of a high centrifugal force accompanying an especially high rotation, the weight 15 urges the valve member 8 in the closed direction and ensures the tight contact of the valve member 8 with the outflow adjusting orifice 5'. Numeral 16 designates a cooling fan which is disposed outside of the cover 3. Solid arrows indicate the opening and closing operations of the valve member 8.

Figure 7A:
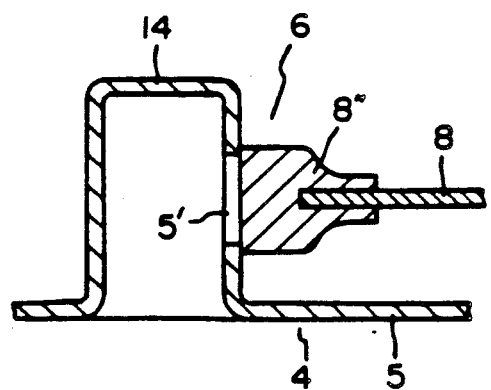
Figure 7B:
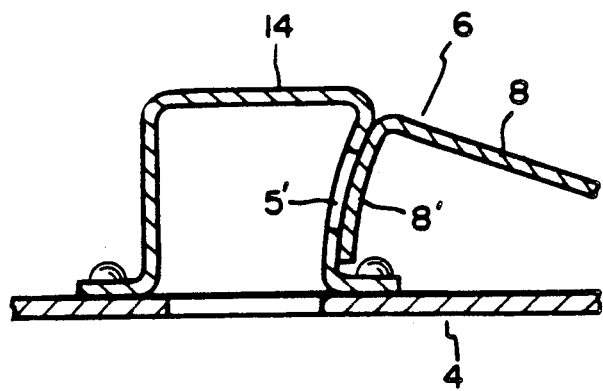
Figure 8:
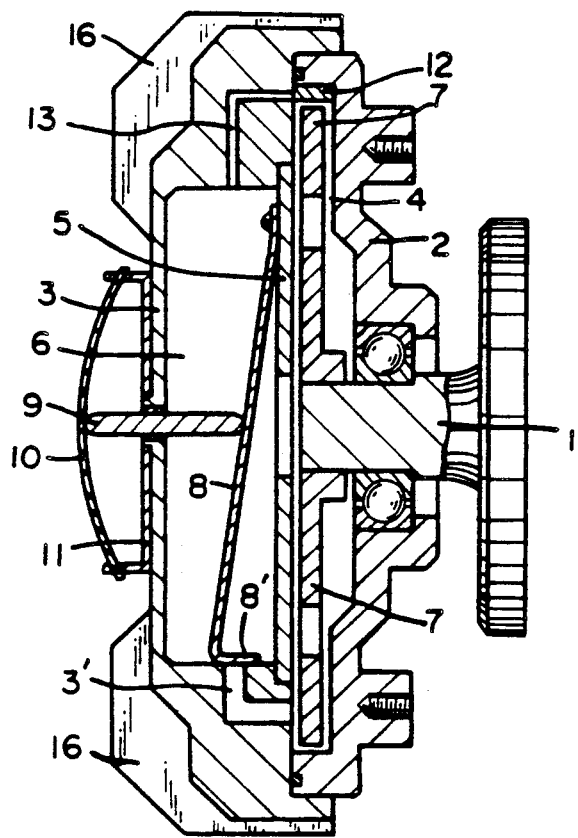
FIG. 8 is a partially cut-away longitudinal section showing a temperature sensitive type liquid fan coupling apparatus according to another embodiment of the present invention.

In the foregoing embodiment, the sealing portion is formed of the bent wall 8' but can be made of a sealing member 8'' fixed to the leading end of the valve member 8, as shown in FIG. 7A. In order to smoothen the sliding motions, the sealing member 8'' may preferably be made of an elastic material such as polytetrafluoroethylene (PTFE). In order to smoothen the movement of the sealing portion, as shown in FIG. 7B, it is preferable to make arcuate the sliding faces of the cap-shaped wall 14 in the vicinity of the opening of the outflow adjusting orifice 5' and the bent wall 8' providing the sealing portion.

Moreover, the foregoing embodiment of the present invention can be applied to the temperature sensitive type fluid fan coupling according to the labyrinth mechanism, in whic the drive disc 7 in the vicinity of the outside and the opposed wall of the sealed container mesh each other in the radial direction.

Next, other embodiments of FIGS. 8 to 11 will be described in the following. In these embodiments, the partition 5 is formed with neither the cap-shaped wall 14 nor the outflow adjusting orifice 5', but this outflow adjusting orifice 5' is formed through the cover 3.

Specifically, the valve member 8 is positioned like the foregoing embodiments at the side of the oil sump 6 and has its one end fixedly riveted to the inner circumference of the partition 5 or the cover 3. The other end of the valve member 8 is bent at 8' to form a sealing portion. This bent wall 8' opens or closes an outflow adjusting orifice 3' which is opened generally at a right angle with respect to the partition 5 and so formed in a portion of the circumference in the aforementioned cover 3 as to lead to the aforementioned torque transmission chamber 4.

Figure 9B:
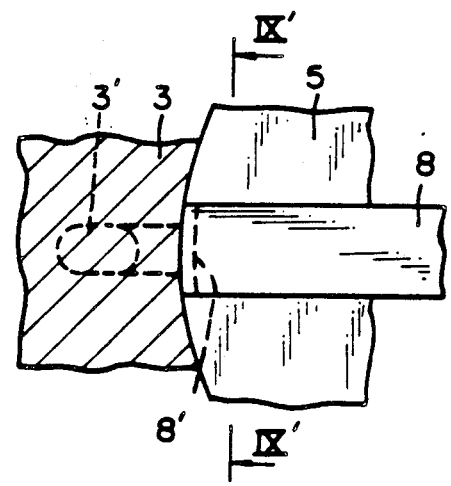
FIG. 9B is a section taken along line IX—IX of FIG. 9A.
Figure 9A:
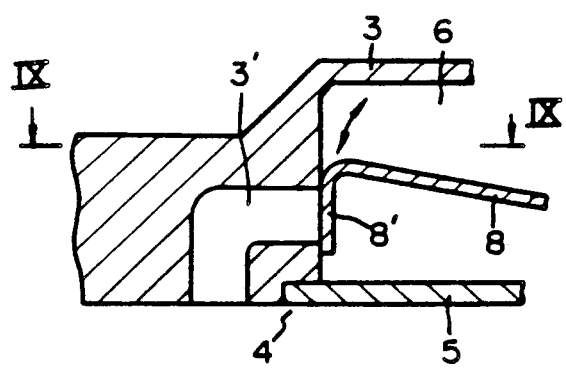
FIG. 9A is an enlarged cut-away section showing an essential portion of the embodiment FIG. 8 in the vicinity of the outflow adjusting orifice according to the present invention.
Figure 9C:
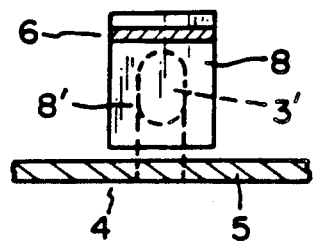
FIG. 9C is a section taken along line IX'—IX' of FIG. 9B.

Incidentally, this outflow adjusting orifice 3' can also have its opening formed into a suitable shape such as a circular, rectangular, triangular, square or trapezoidal shape. By forming a slot extending in the circumferential or axial direction of the oil sump 6, as shown in FIG. 9C, the later-described displacement of the valve member accompanying the temperature change can be accurately reflected upon the opening area to control the opening or closure of the outflow adjusting orifice finely.

Figure 10:
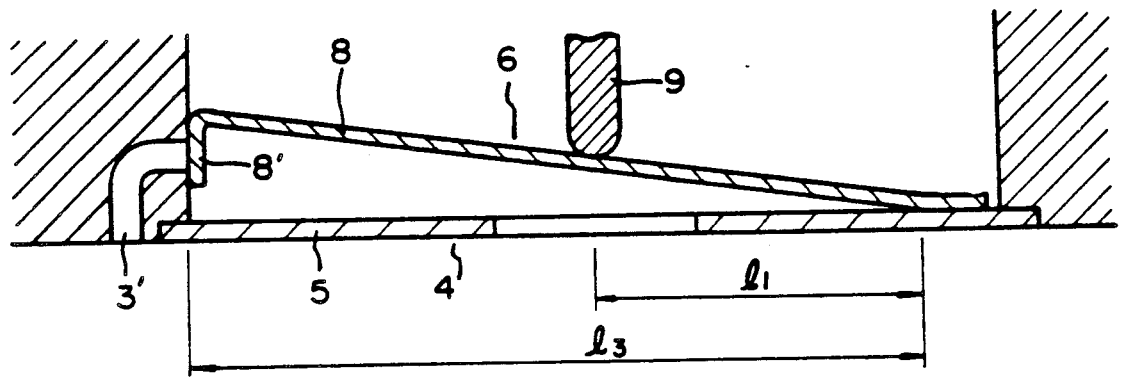
FIG. 10 is an enlarged longitudinal section showing still another embodiment of the present invention.
Figure 13:
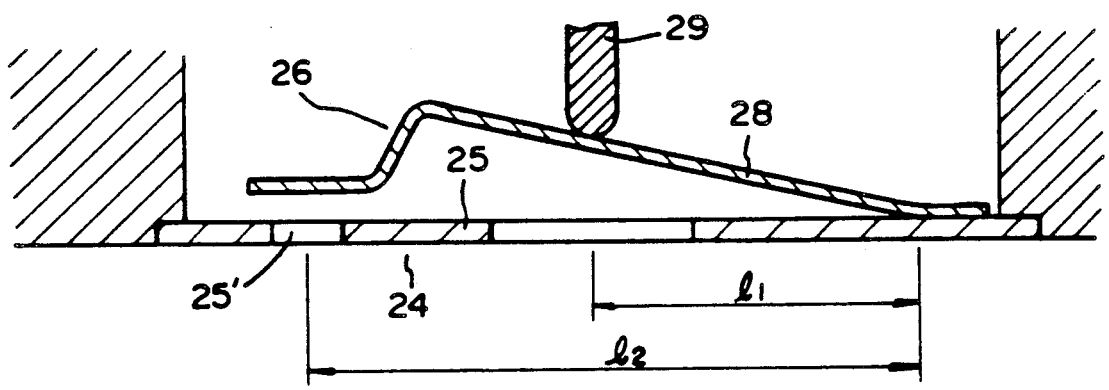
FIG. 13 is an enlarged cut-away section showing a portion in the vicinity of the outflow adjusting orifice of the example of the prior art.

In these embodiments of the present invention, as shown in FIG. 10, the ratio (i.e., lever ratio) between the distance $l_1$ between the fixedly riveted portion and the axis of the rod 9 and the distance $l_3$ between the aforementioned riveted portion and the outflow adjusting orifice 3' is larger than that of the prior art so that the valve member 8 can be highly displaced even by the small movement of the rod 9 to effect the opening or closing operation finely and precisely.

Figure 11A:
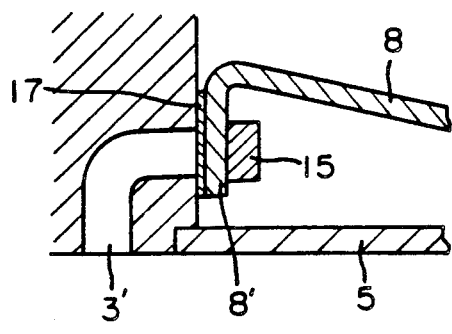
FIGS. 11A to 11C are similar to FIG. 9A but show other embodiments of the present invention, respectively.

In these embodiments, too, the weight 15 can be attached to the vicinity of the leading end of the valve member 8, as shown in FIG. 11A, to ensure the close contact at the outflow adjusting orifice 3' while a high centrifugal force is acting during the high rotation. The sliding motion can be smoothed better by applying an elastic sliding member 17 of polytetrafluoroethylene (PTFE) to the sliding face of the valve member 8.

Figure 11C:
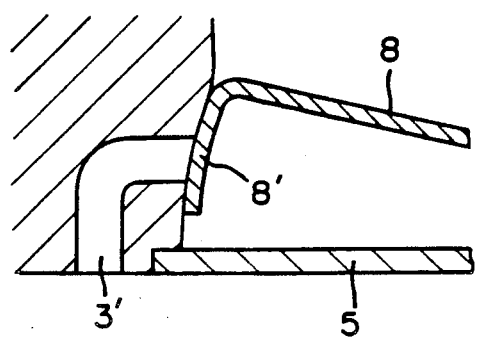
Figure 11B:
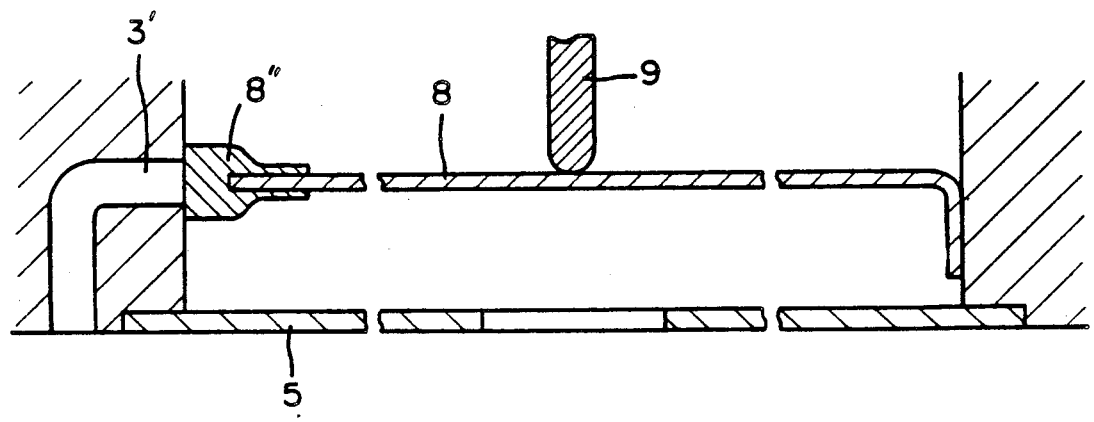

In the foregoing embodiments, the sealing portion is formed of the bent wall 8' but can be made of a sealing material 8'' fixed to the leading end of the valve member 8, as shown in FIG. 11B. In order to smoothen the movement of the sealing portion, more-over, the portion of the oil sump 6 in the vicinity of the opening of the outflow adjusting orifice 3' and the sliding face of the bent wall 8' acting as the sealing portion may preferably be formed generally into arcuate shapes, as shown in FIG. 11C.

Figure 12:
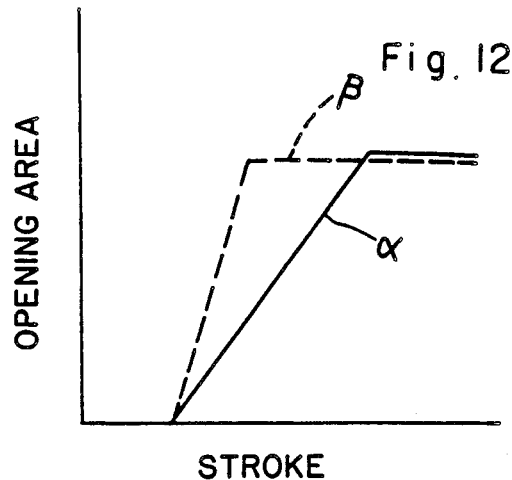
FIG. 12 is a diagram plotting the performance characteristics of the apparatus of the present invention.
Figure 14:
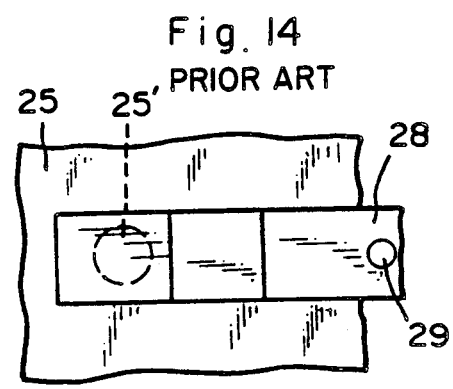
FIG. 14 is a top plan view of FIG. 13.

In the embodiments shown in FIGS. 8 to 11, the relation between the opening area and the stroke is plotted at $\beta$ in FIG. 12.

As has been described hereinbefore, according to the present invention, the temperature sensitive type fluid fan coupling apparatus is given the structures, in which the opening of the outflow adjusting orifice 5' or 3' to be opened or closed by the valve member 8 is formed to intersect the partition 5 generally at a right angle in which the outflow adjusting orifice 5' is formed in the side of the cap-shaped wall 14 formed in the aforementioned partition 5 or in which the outflow adjusting orifice 3' is formed in the inner circumference formed at the side of the cover 3, and in which the sealing portion is formed of either the bent wall 8' at the leading end of the valve member 8 for opening the outflow adjusting orifice or the sealing member 8''. Thanks to these structures, in the opening or closing procedure of the valve member 8, the effective area of the outflow adjusting orifice 5' or 3' is controlled directly by the sealing portion of the valve member 8 as a result of the displacement in the mutual sliding direction between the sealing portion of the valve member 8 and the outflow adjusting orifice 5' or 3' due to the pushing force (for the closing operation) of the connection rod 9 associated with the deformation of the temperature sensing element 10 and the repulsion (for the opening operation) of the valve member 8 itself. Thus, the sucking phenomenon of the valve member 8 can be eliminated to prevent the so-called "hunting" phenomenon thereby to increase or decrease the effective area of the outflow adjusting orifice precisely according to a change in the ambient temperature.

Since, moreover, the distance $l_3$ between the connecting rod 9 and the outflow adjusting orifice 3' is enlarged by forming the outflow adjusting orifice 3' in the inner circumference of the cover, the outflow adjusting orifice 3' is opened or closed even by the slight movement of the connecting rod 9 to ensure the fine and precise operations. Since, still moreover, the outflow adjusting orifice 3' is formed in the outermost circumference of the oil sump 6 containing oil hardly aerated, the oil is fed from said outflow adjusting orifice to reduce the fluctuation of the transmission torque and stabilizes the rotational speed of the fan. As a result, the flow rate controlling function can be accomplished more precisely and stably. If the aforementioned outflow adjusting orifice 3' is formed into the slot, if desired, the highly accurate control of the torque transmission can be effectively exhibited to improve the characteristics of the product better.

What is claimed is:

1. A temperature sensitive type fluid fan coupling apparatus comprising: a sealed container including a casing and a cover, said container having an inner circumference and an outer circumference and being borne through a bearing on a rotating shaft, said shaft having a leading end disposed in the container, a drive disc fixed to the leading end, the drive disc having an outer circumference, and a cooling fan attached to the outer circumference of the container; a partition dividing the inside of said sealed container into an oil sump and a torque transmission chamber housing said drive disc, such that a torque transmission gap is defined between radially outer portions of the drive disc and opposed portions of the sealed container; a dam formed in a portion of the inner circumference of said sealed container and facing the outer circumference of said drive disc, on which the oil is collected at the time of rotation; a circulation passage communicating with said dam and leading from said torque transmission chamber to said oil sump; an outflow adjusting orifice with an opening in the oil sump leading to said torque transmission chamber; a valve member fitted in said oil sump for opening the outflow adjusting orifice if the ambient temperature exceeds a preset value, and closing the same if below said preset value; and a spiral temperature sensing element mounted on said cover and associated with said valve member if deformed in accordance with the temperature change, whereby the effective contact area of the oil at the torque transmission gap is increased or decreased to control the torque transmission from said rotating shaft to said sealed container, wherein the improvement resides in that said outflow adjusting orifice in the oil sump defines a central axis that is generally radially aligned.

2. A temperature sensitive type fluid fan coupling apparatus according to claim 1, wherein a cap-shaped wall is formed on a face of said partition at a radially outer portion thereon, wherein said outflow adjusting orifice leading to said torque transmission chamber is formed in a portion of said cap-shaped wall, and wherein a sealing portion is formed on said valve member for opening or closing said outflow adjusting orifice.

3. A temperature sensitive type fluid fan coupling apparatus according to claim 2, wherein said cap-shaped wall is molded separately of said partition and fixed to said partition.

4. A temperature sensitive type fluid fan coupling apparatus according to claim 2, wherein said sealing portion is a bent wall.

5. A temperature sensitive type fluid fan coupling apparatus according to claim 2, wherein said sealing portion is made of an elastic material.

6. A temperature sensitive type fluid fan coupling apparatus according to claim 2, further comprising a weight disposed in the vicinity of the sealing portion of said valve member.

7. A temperature sensitive type fluid fan coupling apparatus according to claim 1, wherein said outflow adjusting orifice leading to said torque transmission chamber is formed in a portion of the inner circumference of said sealed container forming said oil sump, and wherein a sealing portion is formed on said valve member for opening or closing said outflow adjusting orifice.

8. A temperature sensitive type fluid fan coupling apparatus according to claim 7, wherein said sealing portion is a bent wall.

9. A temperature sensitive type fluid fan coupling apparatus according to claim 7, wherein the inner circumference of the sealed container adjacent said outflow adjusting orifice and the sealing portion of said valve member are formed generally in an arcuate shape.

10. A temperature sensitive type fluid fan coupling apparatus according to claim 7, wherein said outflow adjusting orifice is formed in a slot in said oil sump.

11. A temperature sensitive type fluid fan coupling apparatus comprising: a sealed container including a casing and a cover, said container having an inner circumference and an outer circumference and being borne through a bearing on a rotating shaft said shaft having a leading end disposed in the container, a drive disc fixed to the leading end, the drive disc having an outer circumference, and a cooling fan attached to the outer circumference of the container; a partition having an oil outflow adjusting orifice and dividing the inside of said sealed container into an oil sump and a torque transmission chamber housing said drive disc, such that a torque transmission gap is defined between radially outer portions of the drive disc and opposed portions of the sealed container; a dam formed in a portion of the inner circumference of said sealed container and facing the outer circumference of said drive disc, on which the oil is collected at the time of rotation; a circulation passage communicating with said dam and leading from said torque transmission chamber to said oil sump; a valve member positioned in said oil sump and having one end fixed to an inner wall of said oil sump and a leading end for opening the outflow adjusting orifice of said partition if the ambient temperature exceeds a preset value, and closing the same if below said preset value; and a temperature sensing element mounted on said cover and associated with said valve member if deformed in accordance with the temperature change, whereby the effective contact area of the oil at the torque transmission gap is increased or decreased to control the torque transmission from said rotating shaft to said sealed container, wherein the improvement resides: in that a cap-shaped wall is formed in a face of said partition at a radially outer position thereon, said cap-shaped wall including at least one axially aligned side wall portion; in that said outflow adjusting orifice leading to said torque transmission chamber is formed in the side wall portion of said cap-shaped wall; and in that a sealing portion is formed at the leading end of said valve member for opening or closing said outflow adjusting orifice.

12. A temperature sensitive type fluid fan coupling apparatus comprising: a sealed container including a casing and a cover, said container having an inner circumference and an outer circumference and being borne through a bearing on the rotating shaft, said shaft having a leading end disposed in the container, a drive disc fixed to the leading end, the drive disc having an outer circumference, and a cooling fan attached to the outer circumference of the container; a partition dividing the inside of said sealed container into an oil sump and a torque transmission chamber housing said drive disc, such that a torque transmission gap is defined between radially outer portions of the drive disc and opposed portions of the sealed container; a dam formed in a portion of the inner circumference of said sealed container and facing the outer circumference of said drive disc on which the oil is collected at the time of rotation; a circulation passage communicating with said dam and leading from said torque transmission chamber to said oil sump; a valve member positioned in said oil sump and having one end fixed to an inner wall of said oil sump and a leading end for opening an outflow adjusting orifice leading from said oil sump to said torque transmission chamber, if the ambient temperature exceeds a preset value, and closing the same if below said preset value; and a temperature sensing element mounted on said cover and associated with said valve member if deformed in accordance with the temperature change, whereby the effective contact area of the oil at the torque transmission gap is increased or decreased to control the torque transmission from said rotating shaft to said sealed container, wherein the improvement resides: in that said outflow adjusting orifice leading to said torque transmission chamber is formed in a portion of the inner circumference of said sealed container forming said oil sump; and in that a sealing portion is formed at the leading end of said valve member for opening or closing said outflow adjusting orifice.

* * * * *